(12) United States Patent
Yoneda et al.

(10) Patent No.: US 8,816,562 B2
(45) Date of Patent: Aug. 26, 2014

(54) STATOR FOR ELECTRIC ROTATING MACHINE AND METHOD FOR MANUFACTURING THE SAME

(75) Inventors: Shigenori Yoneda, Anjo (JP); Toshiaki Oohara, Okazaki (JP)

(73) Assignee: Denso Corporation, Kariya (JP)

( * ) Notice: Subject to any disclaimer, the term of this patent is extended or adjusted under 35 U.S.C. 154(b) by 299 days.

(21) Appl. No.: 13/204,041

(22) Filed: Aug. 5, 2011

(65) Prior Publication Data

US 2012/0043849 A1    Feb. 23, 2012

(30) Foreign Application Priority Data

Aug. 5, 2010   (JP) ................................. 2010-176352

(51) Int. Cl.
*H02K 1/06* (2006.01)
*H02K 1/00* (2006.01)

(52) U.S. Cl.
USPC ...... 310/216.092; 310/216.073; 310/216.091; 310/216.093

(58) Field of Classification Search
CPC .................................. H02K 1/00; H02K 3/34
USPC ............................... 310/45, 156.48, 216.069, 310/216.071–216.073, 216.091–216.093, 310/216.096–216.097
See application file for complete search history.

(56) References Cited

U.S. PATENT DOCUMENTS

| | | | | |
|---|---|---|---|---|
| 6,664,703 | B2 * | 12/2003 | Oketani et al. | 310/216.004 |
| 2005/0099086 | A1 * | 5/2005 | Schunk et al. | 310/216 |
| 2007/0224338 | A1 * | 9/2007 | Kimura et al. | 427/118 |
| 2008/0197741 | A1 * | 8/2008 | Schunk et al. | 310/198 |
| 2010/0117465 | A1 * | 5/2010 | Kamiya et al. | 310/51 |

FOREIGN PATENT DOCUMENTS

| | | | |
|---|---|---|---|
| GB | 2260860 A | * | 4/1993 |
| JP | 52060917 A | * | 5/1977 |
| JP | S56-3557 | | 1/1981 |
| JP | H08-340660 | | 12/1996 |
| JP | 2002291179 A | * | 10/2002 |
| JP | 2003-189523 | | 7/2003 |
| JP | P2006-320124 A | | 11/2006 |
| JP | 2009-213309 | | 9/2009 |
| JP | 2010-115057 | | 5/2010 |

OTHER PUBLICATIONS

Japanese Official Action dated Oct. 9, 2012 issued in corresponding Japanese Application No. 2010-176352, with English translation.
Office Action issued Mar. 28, 2014 in corresponding Chinese Application No. 201110227862.4 with English-language translation thereof.

* cited by examiner

*Primary Examiner* — Tran Nguyen
*Assistant Examiner* — Jose Gonzalez Quinone
(74) *Attorney, Agent, or Firm* — Nixon & Vanderhye P.C.

(57) ABSTRACT

A stator for an electric rotating machine includes a stator core that has slots, a stator coil, and an impregnant applied to the inner surface of the stator core. The stator core has a plurality of teeth that divide the slots. Teeth having chamfered surfaces between a projected tip surface and each side surface of the teeth and teeth without chamfered surfaces are intermingled. At least one bent corner part formed at an end of the projected tip surface of the teeth is formed in an arcuate surface. A relationship (R1>R2) is satisfied, where R1 represents a curvature radius of arcuate surfaces formed in the curved corner part where the projected tip surface and the chamfered surface abut and R2 represents a curvature radius of the arcuate surfaces formed in the curved corner part where the projected tip surface and the side surface abut.

8 Claims, 7 Drawing Sheets

STATOR FOR ELECTRIC ROTATING MACHINE AND METHOD FOR MANUFACTURING THE SAME

CROSS-REFERENCE TO RELATED APPLICATION

This application is based on and claims the benefit of priority from earlier Japanese Patent Application No. 2010-176352 filed Aug. 5, 2010, the description of which is incorporated herein by reference.

TECHNICAL FIELD

The present disclosure relates to a stator for an electric rotating machine used as an electric motor or a generator in vehicles, for example, and a method for manufacturing the same.

BACKGROUND

Conventionally, a stator of an electric rotating machine equipped with a circular-shaped stator core that has a plurality of slots arranged in a circumferential direction and a stator coil wound around the slots of the stator core is generally known.

The stator core is constituted to have a plurality of teeth projecting inwardly in a radial direction so as to divide the slots on a side of both sides in a circumferential direction.

In order to secure a resistance against vibration of the stator coil in such a stator, the stator coil is fixed to the stator core by using an impregnant, such as varnish, for example.

An impregnating method of infiltrating the impregnant into the slots of the stator core by dripping the impregnant on an end part of the coil is disclosed in JP-A-2003-189523.

By the way, as a kind of stator core, there is a stator core that is not provided with flange portions projecting in the circumferential direction at tips of the teeth in order to raise a space factor of the coil in the slots.

When the impregnating method disclosed in the JP-A-2003-189523 is adopted in such a stator core, a radially most inner side coil of the stator coil cannot be fixed firmly to the stator core.

That is because, since the flange portions are not provided in an inner side in a radial direction of the radially most inner side coil, there is no place where the impregnant can collect.

Then, in order for the radially most inner side coil to be fixed firmly, it is considered that the impregnant is dropped to an inner circumferential surface from the inner circumferential side of the stator core so that the impregnant is infiltrated into the slots, however, the following problems occur in such a case.

Although the stator core is usually constituted by a plurality of steel plates laminated in an axial direction of the core, if a corner part where a projected tip surface and a side surface of the teeth that abut is formed in straight-like planes when punching the steel plate by pressing, burrs are easily formed in the corner part.

Therefore, if the impregnant is applied to the inner circumferential surface from the inner circumferential side of the stator core, the burrs formed in the corner part become a bank, and the impregnant that remains on the inner circumferential surface (the projected tip surface of the teeth) of the stator core can easily adhere.

Thus, if the impregnant adheres to the inner circumferential surface of the stator core as a hardened material, it interferes with a perimeter part of the rotor disposed at the inner circumferential side of the stator core, and the problems such as a deterioration of the ease of assembly at the time of inserting the rotor and the impregnant being shaved off with the rotor such that it becomes a foreign substance damaging the structures, such as the stator coil and a gear, occurs.

Moreover, as other problems raised by the presence of the burrs, since it becomes easy for cooling oil to contact the teeth surface at the time of oil-cooling of the cooling oil supplied to the inside of the electric rotating machine, causing of worsening of power loss as resistance is mentioned when rotating the rotor.

SUMMARY

An embodiment provides a stator for an electric rotating machine and a method for manufacturing the same that suppresses an occurrence of burrs at a curved corner part formed in both ends in a circumferential direction of a projected tip surface of teeth, and reduces an amount of adhesion of an impregnant to an inner circumferential surface of a stator core.

In a stator for an electric rotating machine according to a first aspect, the stator for the electric rotating machine includes a circular stator core that has a plurality of slots arranged in a circumferential direction, a stator coil wound around the slots of the stator core, and an impregnant applied to the inner circumferential surface of the stator core.

The stator core has a plurality of teeth projecting inwardly in a radial direction so as to divide the slots on a side of both sides in a circumferential direction.

The teeth that have chamfered surfaces and ones that do not have chamfered surfaces are intermingled between a projected tip surface and each side surfaces of the teeth.

At least one of curved corner parts formed in a circumferential direction at both ends of the projected tip surface of the teeth is formed in an arcuated shape.

A relationship ($R1>R2$) is satisfied, where $R1$ represents a curvature radius of arcuated surfaces formed in the curved corner part where the projected tip surface and the chamfered surface abut and $R2$ represents a curvature radius of the arcuated surfaces formed in the curved corner part where the projected tip surface and the side surface abut.

Accordingly, at least one of the curved corner parts formed in the circumferential direction at both ends of the projected tip surface of the teeth is formed in the arcuated shape.

Therefore, when punching a steel plate that constitutes the stator core, occurrence of burrs in the curved corner parts formed in the arcuated shape is suppressed.

Thereby, the amount of the adhered impregnant that remained and adhered to the inner circumferential surface of the stator core can be reduced since it becomes easy for the impregnant to flow through into the slots from the projected tip surface of the teeth when the impregnant is applied to the inner circumferential surface of the stator core from the inner circumferential side of the stator core.

Moreover, since surfaces of the teeth become difficult to cover with cooling oil at the time of cooling the cooling oil supplied to the inside of the electric rotating machine, frictional resistance in a gap between the rotor and the stator core can be reduced when rotating the rotor, thus reduction of loss can be achieved.

Furthermore, degradation of the cooling oil by frictional heat can also be prevented.

Furthermore, the teeth having the chamfered surface have a longer gap length between the rotors compared with the teeth having no chamfered surface, and magnetic resistance at the time of magnetic flux passes becomes large.

Thereby, the amount of magnetic flux that passes through the teeth can be adjusted by stationing the teeth having the chamfered surface in a changing position of the teeth in the same phases in the stator coil or in the changing position of the teeth between different phases in the stator coil.

As a result, an exciting force that generates magnetic noise (NV compelling force) can be reduced.

Moreover, robustness against formation of burrs is securable by configuring the value of the curvature radius R1 larger than that of the curvature radius R2.

In the stator for the electric rotating machine according to a second aspect, the teeth with the chamfered surfaces are stationed in a changing position of the teeth between different phases in the stator coil.

In the stator for the electric rotating machine according to a third aspect, the curved corner part is a part where the projected tip surface and the chamfered surface or the side surface abut.

In the stator for the electric rotating machine according to a fourth aspect, the curved corner parts formed in the arcuated shape are arranged in the same side in the circumferential direction of the teeth at an entire circumferences of the stator core.

In the stator for the electric rotating machine according to a fifth aspect, both of the curved corner parts formed in the circumferential direction at both ends of the projected tip surface of the teeth are formed in the arcuated shape.

In the stator for the electric rotating machine according to a sixth aspect, the chamfered surface is formed in the arcuated surface that extends outwards in a radial direction.

In the stator for the electric rotating machine according to a seventh aspect, no flange portions projecting in the circumferential direction are disposed on the side surfaces of the projected tip parts of the teeth.

In a method for manufacturing the stator for the electric rotating machine according to a eighth aspect, a method is presented for manufacturing the electric rotating machine having a circular stator core that has a plurality of slots arranged in a circumferential direction, a stator coil wound around the slots of the stator core, and an impregnant applied to the inner circumferential surface of the stator core.

The stator core has a plurality of teeth projecting inwardly in a radial direction so as to divide the slots on a side of both sides in a circumferential direction; and The teeth that have chamfered surfaces and ones that do not have chamfered surfaces between a projected tip surface and each side surfaces of the teeth are intermingled.

The method has steps of forming at least one of curved corner parts formed in a circumferential direction at both ends of the projected tip surface of the teeth in an arcuated surface, and configuring a value of R1 to be larger than a value of R2 (R1>R2) when R1 represents a curvature radius of the arcuated surfaces formed in the curved corner part where the projected tip surface and the chamfered surface abut and R2 represents a curvature radius of the arcuated surfaces formed in the curved corner part where the projected tip surface and the side surface abut.

BRIEF DESCRIPTION OF THE DRAWINGS

In the accompanying drawings:

FIGS. 5A and 5B show explanatory schematic views of application process of an impregnant according to the embodiment.

DETAILED DESCRIPTION OF THE PREFERRED EMBODIMENTS

With reference to the drawings, hereinafter will be described an embodiment that materialized a stator of an electric rotating machine of the present disclosure.

Figure 1:
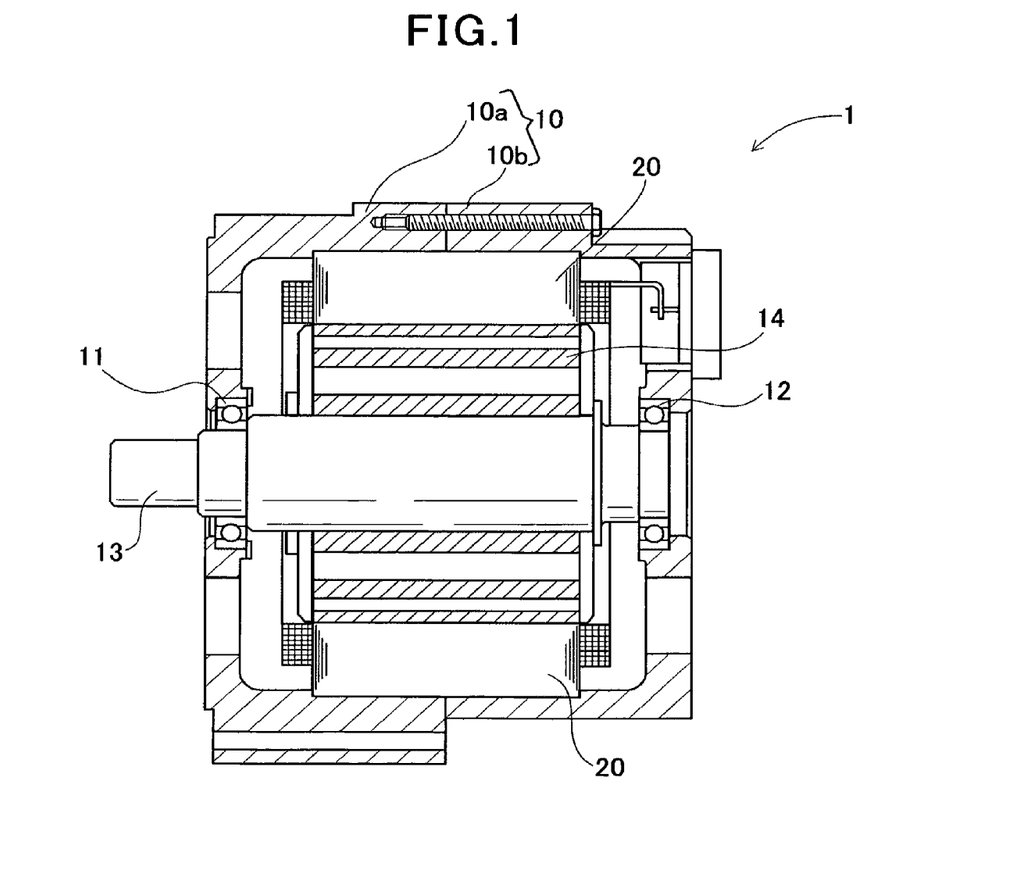
FIG. 1 shows a schematic sectional view in an axial direction of a composition of an electric rotating machine according to an embodiment.

As show in FIG. 1, an electric rotating machine 1 of the present embodiment has a housing 10, a rotor 14, and a stator 20. The housing 10 is formed by joining openings of a pair of housing components 10a and 10b that has substantially a bottomed cylindrical shape.

The rotor 14 fixed to a rotating shaft 13 supported rotatably by the housing 10 via bearings 11 and 12. The stator 20 is fixed to the housing 10 in a position that surrounds the rotor 14 inside the housing 10.

The rotor 14 is formed by arranging a permanent magnet in an outer circumferential side of the stator 20 that faces an inner circumferential side. A plurality of poles having different magnetic properties of the permanent magnet are arranged in a circumferential direction alternately.

The number of the magnetic poles of the rotor 14 is not limited because it varies with the electric rotating machine. The rotor with eight poles (4 N poles, 4 S poles) is used in the present embodiment.

Figure 2A:
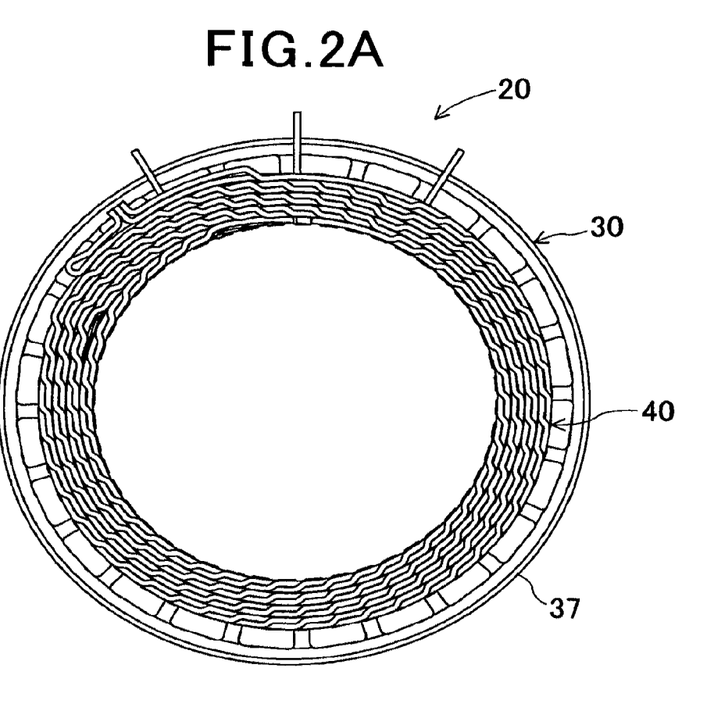
FIG. 2A shows a plan view of a stator.
Figure 2B:
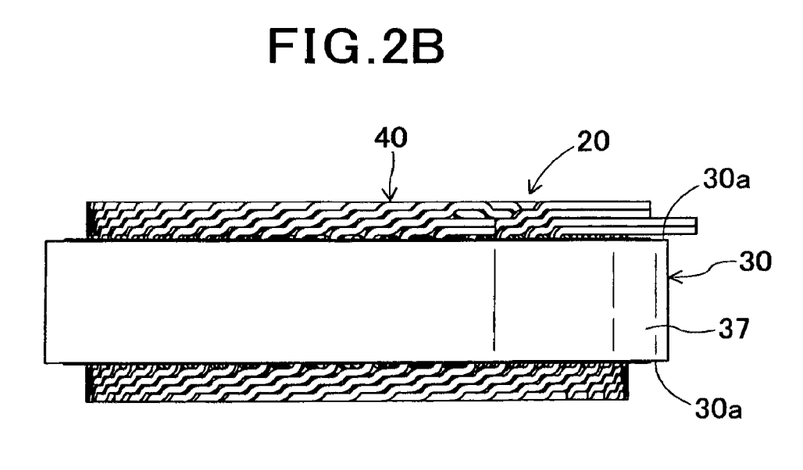
FIG. 2B shows an elevational view of the stator seen from a side according to the embodiment.

The stator 20 has a stator core 30 formed by a plurality of divided cores 32, and a 3-phase stator coil 40 formed from a plurality of lead wires as shown in FIG. 2A and FIG. 2B. In addition, insulating paper may be disposed between the stator core 30 and the stator coil 40.

Next, the stator core 30 is explained with reference to FIG. 3 and FIGS. 4A to 4C.

As shown in FIG. 3 and FIGS. 4A to 4C, the stator core 30 is formed in a circular shape with the plurality of divided cores 32 (24 pieces in the present embodiment) divided in the circumferential direction, and has a plurality of slots 31 arranged in an inner circumferential side in the circumferential direction of the stator core 30.

Figure 3:
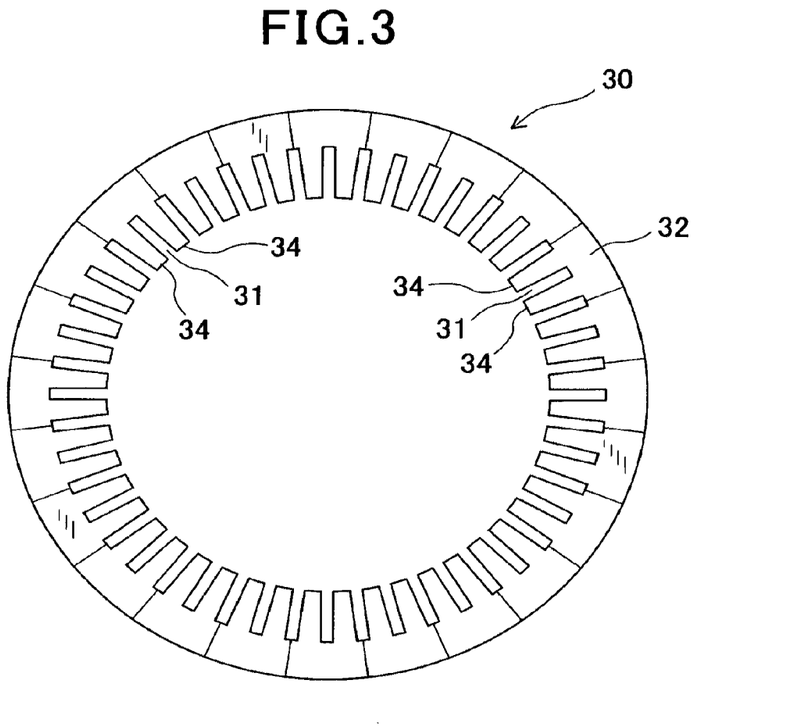
FIG. 3 shows a plan view of a stator core according to the embodiment.

The stator core 30 is formed by a circular-shaped back core part 33 located in an outer circumferential side of the stator core 30 and a plurality of teeth 34 projecting from the back core part 33 inwardly in a radial direction while arranged in the circumferential direction with a predetermined separation.

By this, the slots 31 that open to the inner circumferential side of the stator core 30 and extend in the radial direction is formed between side surfaces 34a of the adjoining teeth 34 that face each other in the circumferential direction.

The side surfaces 34a of the adjoining teeth 34 that face each other in the circumferential direction, i.e., a pair of side surfaces 34a in which a single slot 31 is divided, are parallel mutually.

Thereby, each slot 31 is extended in the radial direction with a fixed width size in the circumferential direction.

By the way, there are no flange portions projecting in the circumferential direction disposed on the side surfaces 34a of the projected tip parts of the teeth 34.

The slots 31 are formed at a rate of two per 1 phase of the stator coil 40 to a number of the magnetic poles (8) of a rotor since the stator coil 40 is a distributed winding of a double slot in the present embodiment.

That is, the 8×3×2=48 pieces of slots 31 are formed. In this case, the 48 slots 31 are formed by the same number of the 48 teeth 34 as the slots 31.

Figure 4A:
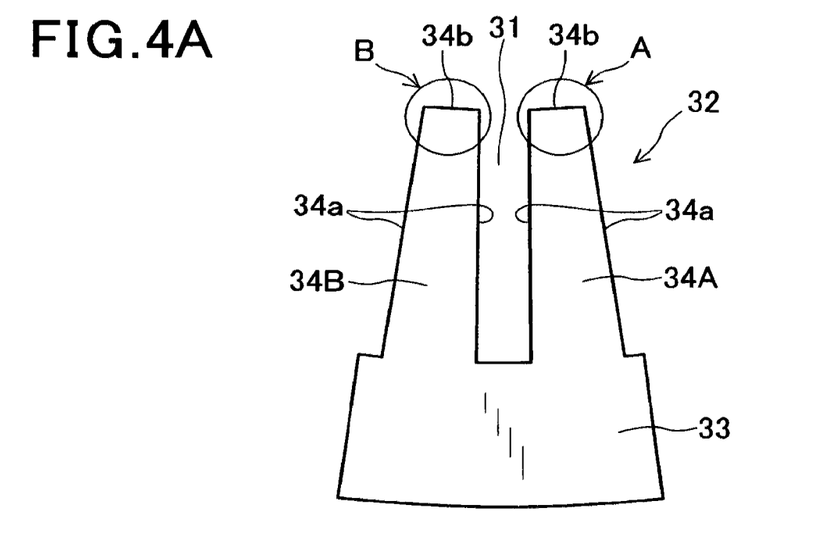
FIG. 4A shows a plan view of a divided core.
Figure 4B:
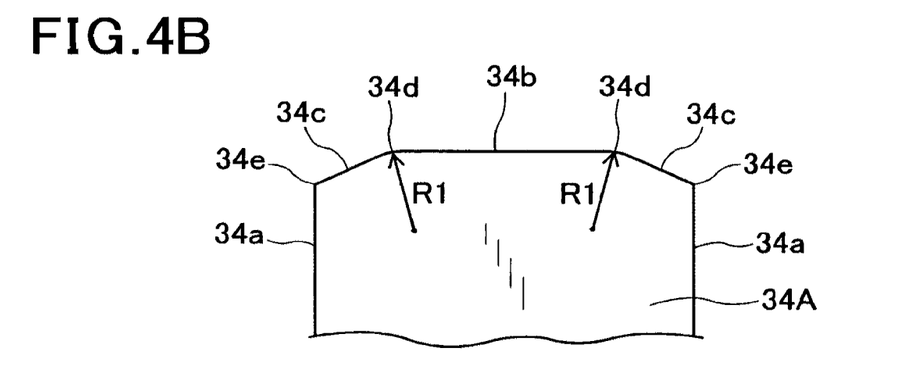
FIG. 4B shows an enlarged part A of FIG. 4A.
Figure 4C:
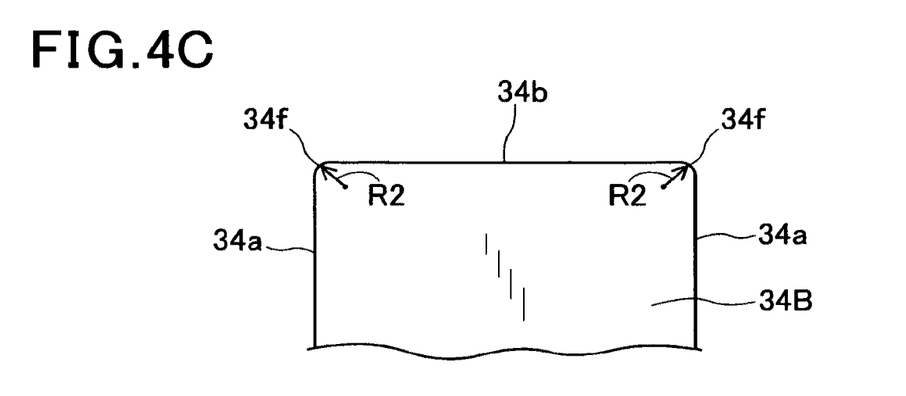
FIG. 4C shows an enlarged part B of FIG. 4A.

The 48 teeth 34 that have chamfered surfaces 34c (henceforth "the chamfered teeth 34A") and ones that do not have chamfered surfaces 34c (henceforth "the non-chamfered teeth 34B") between a projected tip surface 34b and each side surfaces 34a, are intermingled as shown in FIGS. 4A to 4C.

In the present embodiment, there are provided 16 pieces of the chamfered teeth 34A and 32 pieces of the non-chamfered teeth 34B, and single chamfered teeth 34A is arranged for every two non-chamfered teeth 34B.

That is, the chamfered teeth 34A are stationed in the changing position of the teeth between different phases in the 3-phase stator coil 40.

As shown in FIG. 4B, the chamfered surfaces 34c are formed between the projected tip surface 34b and each side surfaces 34a in the chamfered teeth 34A.

In addition, the two curved corner parts 34d where the projected tip surface 34b and each chamfered surface 34c abut are formed in arcuated surfaces with a curvature radius R1.

That is, both of the curved corner parts 34d formed in the circumferential direction at both ends of the projected tip surface 34b of the teeth 34 are formed as arcuated surfaces.

On the other hand, two curved corner parts 34e where the side surfaces 34a and the chamfered surface 34c abut are not made into arcuated surfaces, but are in the state where approximately straight-like planes abut.

Moreover, as shown in FIG. 4C, two curved corner parts 34f where the projected tip surface 34b and each side surfaces 34a abut in the non-chamfered teeth 34B are formed in arcuated surfaces with a curvature radius R2 smaller than that of the curvature R1 of the curved corner parts 34d.

Also in this case, both of the curved corner parts 34f formed in the circumferential direction at both ends of the projected tip surface 34b of the teeth 34 are formed in the arcuated shape like the chamfered teeth 34A.

In addition, the divided cores 32 that constitute the stator core 30 are formed by laminating a plurality of electromagnetic steel sheets in an axial direction of the stator core 30. The steel sheets are formed in a predetermined form by press punching.

Moreover, the stator core 30 is fixed (shape retained) in a circular shape by an outer cylinder 37 fitted to an outer circumference of the divided core 32 arranged in a circular shape (refer to FIG. 2).

The stator coil 40 is formed by at first forming a belt-like lead wire assembly by laminating a predetermined number (12 in the present embodiment) of lead wires formed in a predetermined wave-shape in a predetermined state, and then the lead wire assembly is wound spirally in a cylindrical shape.

The lead wires that constitutes the stator coil 40 is formed in the wave-shaped form that have slot accommodation parts disposed in the slots 31 of the stator core 30, and turn parts that connect the slot accommodation parts accommodated in the slots 31 from which the circumferential directions differ in outside of the slot 31.

The lead wires adopt a rectangular wire with an insulation coating made by a conductor with a rectangle section and an insulation film that coats an outer circumference of the conductor.

Assembling of the stator coil 40 and the stator core 30 is performed as follows. First, the teeth 34 of each divided cores 32 are inserted into the stator coil 40 from the outer circumferential side of the stator coil 40. Next, all the divided cores 32 are arranged in a circular form along with the stator coil 40. Finally, the cylindrical outer cylinder 37 is fitted to the outer circumference of the divided core 32.

Thereby, the stator coil 40 is assembled to the state where the predetermined slot accommodation part of each lead wire is accommodated in the predetermined slot 31 of the stator core 30, as shown in FIG. 2.

In this case, the slot accommodation part of each lead wire is accommodated in the slot 3 in every predetermined number of slots (3-phase×2 pieces (double slot)=six pieces in the present embodiment).

Moreover, the turn parts that connect the adjoining slot accommodation parts of the lead wires are projected from the both end sides 30a in an axial direction of the stator core 30, and coil ends are formed in both ends of the stator coil 40 in an axial direction by a large number of the projected turn parts.

Then, in order to secure a resistance against vibration of the stator coil 40 attached to the stator core 30, a fixation of the stator coil 40 to the stator core 30 is performed by applying the impregnant.

Figure 5A:
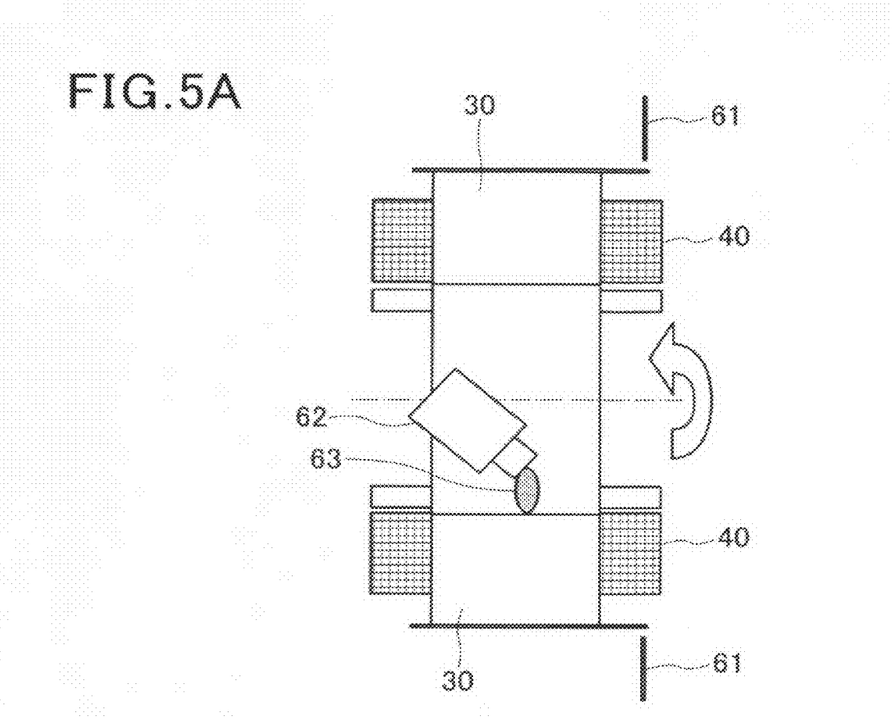
FIG. 5A shows a sectional view where the stator is cut in an axial direction.
Figure 5B:
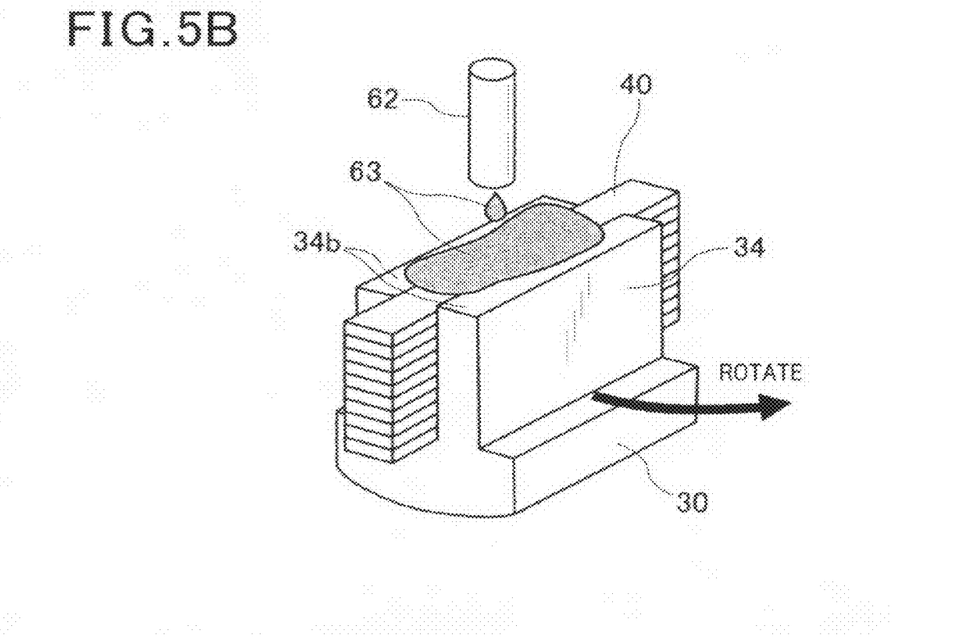
FIG. 5B shows a partial perspective view of a part of the stator.

As shown in FIG. 5A and FIG. 5B, the stator core 30 is held by a holding part 61 first so that the axial direction of the stator core 30 becomes horizontal.

Then, while rotating the stator core 30 around an axis with a rotating apparatus, the impregnant 63 is applied throughout the inner circumferential surface of the stator core 30 by dripping the impregnant 63 from a discharging part 62 to the inner circumferential surface (the projected tip surface 34b of the teeth 34) from the inner circumferential side of the stator core 30.

By this, in the either case for the chamfered teeth 34A and the non-chamfered teeth 34B, the applied impregnant 63 infiltrates smoothly into the slots 31 without collecting in the projected tip surface 34b since both of the curved corner parts 34d, 34f formed in the circumferential direction at both ends of the projected tip surface 34b are formed in the arcuated shape.

Therefore, the amount of the adhered impregnant 63 that remained and adhered to the inner circumferential surface of the stator core 30 is reduced sharply.

Then, when the impregnant 63 that is infiltrated in the slots 31 solidifies, the stator coils 40 (slot accommodation parts) in the slots 31 are fixed to the stator core 30, and the resistance against vibration is secured.

Figure 6:
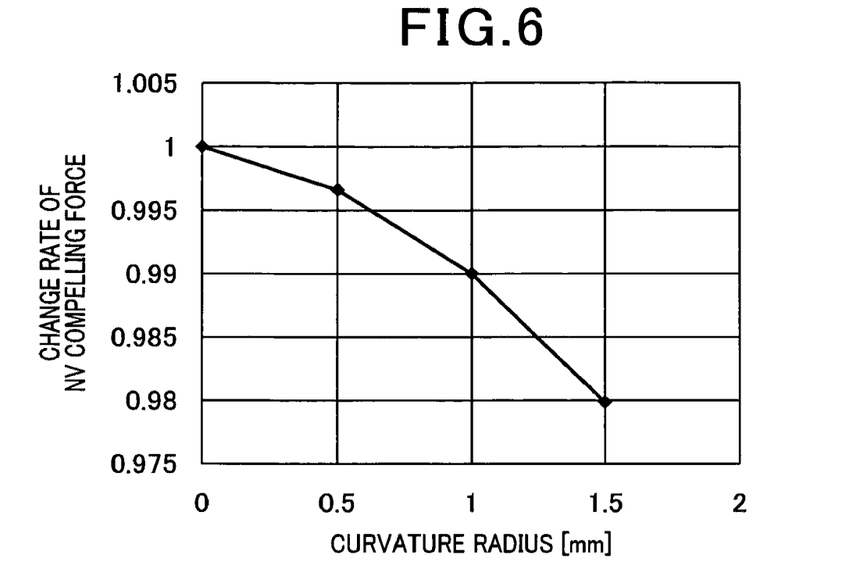
FIG. 6 shows a graph of a relation between a change rate of NV compelling force of the electric rotating machine and a curvature radius R1 according to the embodiment.
Figure 7:
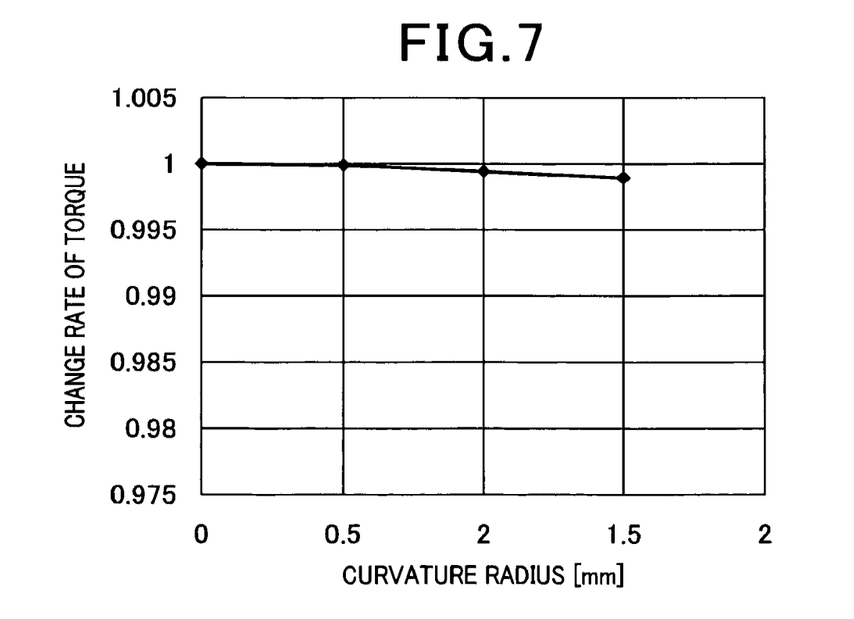
FIG. 7 shows a graph of a relation between a change rate of torque of the electric rotating machine and the curvature radius R1 according to the embodiment.

By the way, in the stator 20 of the present embodiment, when influences the NV compelling force and torque are investigated at the time when a value of the curvature radius R1 of the curved corner part 34d of the chamfered teeth 34A changes, results shown in FIG. 6 and FIG. 7 are obtained. Here, the NV compelling force means an exciting force that generates magnetic noise.

In this case, an outside diameter of the stator core 30 is 230 mm, an inner diameter is 150 mm, and a length in the axial direction is 50 mm, while a thickness of the electromagnetic steel sheet that constitutes the stator core 30 is 0.3 mm.

Clearly seen from FIG. 6, a change rate of the NV compelling force falls gradually as the value of the curvature radius R1 becomes large.

Therefore, by enlarging the curvature radius R1, the h NV compelling force can be greatly reduced.

Moreover, clearly seen from FIG. 7, a change rate of torque hardly changes even if the value of the curvature radius R1 changes. Therefore, the size of the curvature radius R1 is understood that the sensitivity to torque is small.

According to the stator 20 of the electric rotating machine 1 of the present embodiment constituted as mentioned above, at least one of the curved corner parts 34d, 34f formed in the circumferential direction at both ends of the projected tip surface 34b of the teeth 34 is formed in the arcuated shape.

Therefore, when punching the steel plate that constitutes the stator core 30 by pressing, occurrence of burrs in the curved corner parts 34d, 34f formed in the arcuated shape is suppressed.

Thereby, the amount of the adhered impregnant 63 that remains and adheres to the inner circumferential surface of the stator core 30 can be reduced since it becomes easy for the impregnant 63 to flow through into the slot 31 from the projected tip surface 34b of the teeth when the impregnant 63 is applied to the inner circumferential surface of the stator core 30 from the inner circumferential side of the stator core 30.

In particular, with the present embodiment, since both of the curved corner parts 34d, 34f formed in the circumferential direction at both ends of the projected tip surface 34b are formed in the arcuated shape, the redundancy at the time of assembling the stator core 30 and the stator coil 40 improves.

Furthermore, since a rotating direction of the stator core 30 is not restricted when applying the impregnant 63 to the inner circumferential surface from the inner circumferential side of the stator core 30 while rotating the stator core 30, versatility improves also by this.

Moreover, since surfaces of the teeth 34 become difficult to cover with cooling oil at the time of cooling the cooling oil supplied to the inside of the electric rotating machine 1, frictional resistance in a gap between the rotor 14 and the stator core 30 can be reduced when rotating the rotor 14, thus reduction of loss can be achieved.

Furthermore, degradation of the cooling oil by frictional heat can also be prevented.

Moreover, in the present embodiment, the chamfered teeth 34A and the non-chamfered teeth 34B are intermingled, and the chamfered teeth 34A are stationed in the changing position of the teeth between different phases in the 3-phase stator coil 40.

By this, the NV compelling force can be reduced since the amount of magnetic flux that passes through the teeth 34 can be adjusted.

Moreover, in the present embodiment, since the arcuated surfaces formed in the curved corner part 34d of the chamfered teeth 34A is configured larger than the curvature radius R2 of the arcuated surfaces formed in the curved corner part 34f of the non-chamfered teeth 34B, robustness against formation of burrs is securable.

It should be appreciated that the present disclosure is not limited to the embodiment mentioned above, but may be variously modified in the range that does not deviate from the meaning of the present disclosure.

For example, although the chamfered teeth 34A are stationed in the changing position of the teeth between different phases in the 3-phase stator coil 40 in the embodiment mentioned above, the teeth 34 may be stationed in the changing position within the same phase.

Moreover, although both of the curved corner parts 34d, 34f formed in the circumferential direction at both ends of the projected tip surface 34b of the teeth 34 are formed in the arcuated shape, one of the curved corner parts 34d, 34f formed in the circumferential direction at one end may be formed in the arcuated surface.

In such a case, the curved corner parts 34d, 34f formed in the arcuated shape are preferred to be arranged in the same side in the circumferential direction of the teeth 34 at the entire circumferences of the stator core 30.

In this way, the amount of the adhered impregnant 63 that remained and adhered to the inner circumferential surface of the stator core 30 is surely reduced.

The reason is that the impregnant 63 applied can be infiltrated certainly into the slots 31 from the projected tip surface 34b of the teeth 34, since the curved corner parts 34d, 34f formed in the arcuated shape are to be positioned in the back side of the rotating direction when applying the impregnant 63 to the inner circumferential surface from the inner circumferential side of the stator core 30 while rotating the stator core 30.

Figure 8:
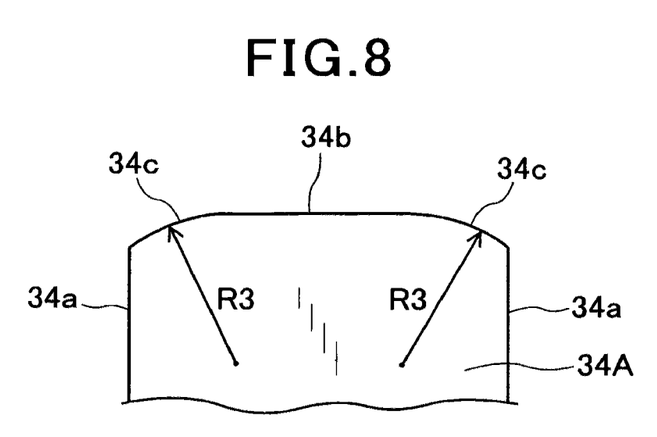
FIG. 8 shows a partial plan view of a tip part of teeth of the stator core according to a modification.

Moreover, although the chamfered surface 34c of the chamfered teeth 34A is formed in a flat plane in the embodiment mentioned above, the chamfered surface 34c may be formed in the arcuated shape that extends outwards in a radial direction as shown in FIG. 8.

Thereby, reduction of the NV compelling force can be realized more effectively.

What is claimed is:

1. An electric rotating machine comprising:
a circular stator core that has a plurality of slots arranged in a circumferential direction;
a stator coil wound around the slots of the stator core; and
an impregnant applied to the inner circumferential surface of the stator core;
wherein:
the stator core has a back core part and a plurality of teeth projecting from the back core part inwardly in a radial direction so as to divide the slots on a side of both sides in a circumferential direction;
teeth that have chamfered surfaces between a respective projected tip surface and each respective side surface of the teeth, and teeth that do not have chamfered surfaces between a respective projected tip surface and each respective side surface of the teeth are intermingled;
in a cross-section view, an edge of each side surface of the teeth that have chamfered surfaces extends substantially linearly from the chamfered surface to the back core part;
at least one of curved corner parts formed in a circumferential direction at both ends of the projected tip surface of the teeth is formed in an arcuated shape; and
a relationship (R1>R2) is satisfied, where R1 represents a curvature radius of arcuated surfaces formed in the curved corner part where the projected tip surface and the chamfered surface abut and R2 represents a curvature radius of the arcuated surfaces formed in the curved corner part where the projected tip surface and the side surface abut.

2. The electric rotating machine according to claim 1, wherein the teeth with the chamfered surfaces are stationed in a changing position of the teeth between different phases in the stator coil.

3. The electric rotating machine according to claim 1, wherein the curved corner part is a part where the projected tip surface and the chamfered surface or the side surface abut.

4. The electric rotating machine according to claim 1, wherein the curved corner parts formed in the arcuated shape are arranged in the same side in the circumferential direction of the teeth.

5. The electric rotating machine according to claim 1, wherein both of the curved corner parts formed in the circumferential direction at both ends of the projected tip surface of the teeth are formed in the arcuated shape.

6. The electric rotating machine according to claim 1, wherein the chamfered surface is formed in the arcuated surface that extends outwards in a radial direction.

7. The electric rotating machine according to claim 1, wherein no flange portions projecting in the circumferential direction are disposed on the side surfaces of the projected tip parts of the teeth.

8. A method for manufacturing a stator for an electric rotating machine having a circular stator core that has a plurality of slots arranged in a circumferential direction;
   a stator coil wound around the slots of the stator core;
   an impregnant applied to the inner circumferential surface of the stator core;
   the stator core having a back core part and a plurality of teeth projecting from the back core part inwardly in a radial direction so as to divide the slots on a side of both sides in a circumferential direction; and
teeth that have chamfered surfaces between a respective projected tip surface and each respective side surface of the teeth, and teeth that do not have chamfered surfaces between a respective projected tip surface and each respective side surface of the teeth are intermingled,
in a cross-sectional view, an edge of each side surface of the teeth that have chamfered surfaces extends substantially linearly from the chamfered surface to the back core part, the method comprising:
forming at least one of curved corner parts formed in a circumferential direction at both ends of the projected tip surface of the teeth in an arcuated surface; and
configuring the teeth such that (R1>R2), when R1 represents a curvature radius of the arcuated surfaces formed in the curved corner part where the projected tip surface and the chamfered surface abut and R2 represents a curvature radius of the arcuated surfaces formed in the curved corner part where the projected tip surface and the side surface abut.

* * * * *